March 4, 1941.    W. E. McKIBBEN    2,233,924

DYNAMOELECTRIC MACHINE

Filed Sept. 30, 1939

Inventor:
Wayne E. McKibben,
by Harry E. Dunham
His Attorney.

Patented Mar. 4, 1941

2,233,924

UNITED STATES PATENT OFFICE 2,233,924

DYNAMOELECTRIC MACHINE

Wayne E. McKibben, Scotia, N. Y., assignor to General Electric Company, a corporation of New York Application September 30, 1939, Serial No. 297,314

2 Claims. (Cl. 171—209)

My invention relates to dynamoelectric machines, and more particularly to machines provided with a permanent magnet excitation system and method of making the same.

Heretofore permanent magnets of the iron-nickel-aluminum alloy type, as described in United States Patent No. 1,947,274, Ruder, have been used for the permanent magnet excitation system of small dynamoelectric machines. This particular magnet alloy is highly desirable for such applications due to its high coercive force and because it retains its magnetism almost indefinitely. Furthermore, it has also been found desirable to use flux concentrators according to United States Patent No. 2,059,886, Merrill, with this particular alloy in dynamoelectric machine excitation systems. However, it has been found that when this type of alloy is subjected to considerable impact and vibration, there is a great possibility that it will fracture. This appears to be due to the fact that this magnet alloy is very brittle.

An object of my invention is to provide a dynamoelectric machine having a permanent magnet excitation system of the above-mentioned type which is simple, economical, and dependable.

Another object of my invention is to provide a rotatable member of a dynamoelectric machine with the above described type of permanent magnet excitation system having a reinforcing prefabricated sleeve member arranged about the permanent magnet.

A further object of my invention is to provide an improved flux concentrating means and reinforcing element for cast magnet alloy dynamoelectric machine excitation members.

A still further object is to provide an improved method for arranging a reinforcing element around a dynamoelectric machine magnet excitation member.

Further objects and advantages of my invention will become apparent from the following description referring to the accompanying drawing, and the features of novelty which characterize my invention will be pointed out with particularity in the claims annexed to and forming a part of this specification.

Figure 1:
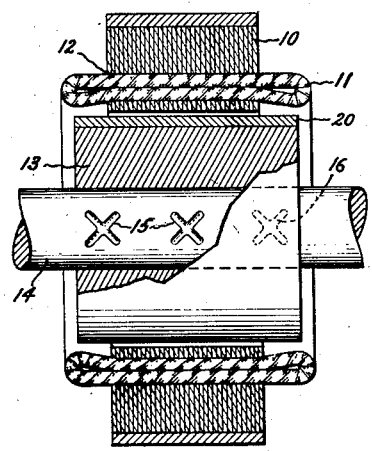
Figure 2:
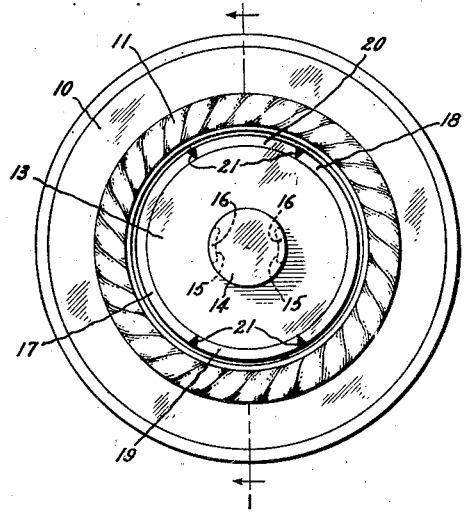

In the drawing, Fig. 1 is a partial sectional side elevation of a dynamoelectric machine having a rotatable member provided with an embodiment of my improved excitation system; Fig. 2 is an end view of the machine illustrated in Fig. 1 and Fig. 3 is an end view of a modification of the excitation system shown in Figs. 1 and 2.

Referring to the drawing, in Figs. 1 and 2 I have illustrated a dynamoelectric machine including a stationary member provided with a laminated core 10 of magnetic material having a winding 11 arranged in slots 12 thereof. A rotatable member is arranged to provide the field excitation system for the dynamoelectric machine and includes permanent magnet pole pieces formed of a substantially cylindrical member 13 supported on a shaft 14. This magnet material may be of the iron-nickel-aluminum alloy type as mentioned above, and the permanent magnet pole pieces are formed by casting the magnet material around the shaft. In order to prevent displacement of the magnet material 13 with respect to the shaft 14, I provide a series of grooves or indentations 15 on either side of the shaft into which project complementary projections 16 on the magnet element 13. These projections 16 are formed when the molten material is cast around the shaft since some flows into the indentations 15, so that on solidification the permanent magnet has the integral projecting portions 16 snugly fitting into the indentations.

When a rotor made of the above-mentioned cast alloy is rotated at a high rate of speed and is subjected to considerable vibration, it has been found that there is a danger of fracture of the magnet material due to its normal brittleness. As compared with the ordinary steel used in industry today, it may be said that magnet material of the iron-nickel-aluminum alloy type has a relatively low impact or tensile strength, and this danger of possible fracture is particularly prevalent when the dynamoelectric machine is placed in service upon aircraft which subjects the machine to considerable impact and vibration. To overcome this difficulty, I arrange a reinforcing sleeve around the magnet material 13 and preferably provide a shrink fit between these two elements. Such a shrink fit of the sleeve over the magnet material sets up compressive stresses so that the danger of fracture is greatly lessened. As is more particularly shown in Fig. 2, this prefabricated sleeve includes arcuate pole faces 17 and 18 of any suitable soft magnetic material, such as soft steel, and interconnecting arcuate members 19 and 20 of any suitable nonmagnetic material, such as stainless steel. These pole pieces and interconnecting members are securely joined together in any suitable manner, as by welding as shown at 21. The sleeve member is made of material having a higher impact or tensile strength than the magnet material so that it will provide the desired reinforcement, and the shrink fit between the sleeve member and the permanent magnet member provides an arrangement for maintaining these members in assembled relation. A successful method for providing this shrink fit is to grind the outer peripheral surface of the magnet material and machine or grind the inner surface of the prefabricated sleeve to dimensions, so that if the normal operating conditions of the dynamoelectric machine were simulated, the diameter of the cast magnet material would be slightly greater than the inside diameter of the prefabricated sleeve. The shrink fit between the cast magnet material and the sleeve member is then made by either shrinking the magnet material by cooling with dry ice or the like, or expanding the prefabricated sleeve by heating, to allow the former to be inserted into the latter, and then allowing them to return to normal temperatures in assembled relation. It may also be desirable to both shrink the magnet material and expand the sleeve when making the shrink fit.

Figure 3:
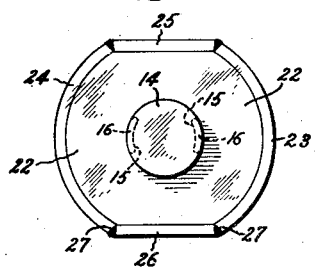

A modification of my improved dynamoelectric machine excitation system is shown in Fig. 3, and includes permanent magnet pole pieces 22. In this construction the permanent magnet pole pieces 22 are formed with arcuate outer faces connected together by integral intermediate side sections having flat outer surfaces. This permanent magnet is of a cast construction and is made in the same manner as the arrangement shown in Figs. 1 and 2, with projections 16 extending into intimate engagement with complementary grooves 15 in a supporting shaft 14. As in the arrangement shown in Figs. 1 and 2, a reinforcing or supporting sleeve is arranged about the permanent magnet material and is provided with pole faces 23 and 24 of magnetic material and non-magnetic interconnecting members 25 and 26. This sleeve conforms to the general peripheral surface outline of the permanent magnet member. The pole faces 23 and 24 are of arcuate shape arranged over the arcuate surfaces of the pole pieces 22 and the interconnecting members 25 and 26 are straight bars of non-magnetic material arranged over the flat surfaces of the intermediate sections of the magnet member. As in the first described embodiment, the pole pieces and interconnecting members are securely joined together in any suitable manner, such as by welding as shown at 27, and a shrink fit is formed between the sleeve and the permanent magnet member. This construction has the advantage of a lighter structure, which is always desirable in airplane accessories, and also effects a saving in material.

Although I have shown and described particular embodiments of my invention, I do not desire my invention to be limited to the particular embodiments described, and I intend in the appended claims to cover all modifications which do not depart from the spirit and scope of my invention.

What I claim as new and desire to secure by Letters Patent of the United States, is:—

1. A dynamoelectric machine having a core of magnetic material provided with a winding, a magnetic excitation system including permanent magnet pole pieces of material having a relatively low impact strength, and a prefabricated sleeve member surrounding the pole pieces and in intimate contact therewith including pole faces of magnetic material and interconnecting members of non-magnetic material, said sleeve being made of material having a relatively higher impact strength so that the pole pieces are supported and the danger of fracture of the pole pieces is lessened.

2. A dynamoelectric machine including a stationary member having a core of magnetic material provided with a winding and a rotatable member having a shaft member and permanent magnet pole pieces cast thereon, said shaft having indentations and said cast member having integral projections snugly fitting into said indentations.

WAYNE E. McKIBBEN.